US012687562B2

(12) United States Patent
Li et al.

(10) Patent No.: US 12,687,562 B2
(45) Date of Patent: Jul. 21, 2026

(54) SHEAR MODE PIEZOELECTRIC ACCELEROMETER

(71) Applicant: Piezo Ultratech CO., LTD., Tainan City (TW)

(72) Inventors: Cheng-Ying Li, Tainan City (TW); Sheng-Yuan Chu, Tainan City (TW)

(73) Assignee: Piezo Ultratech CO., LTD., Tainan City (TW)

( * ) Notice: Subject to any disclaimer, the term of this patent is extended or adjusted under 35 U.S.C. 154(b) by 344 days.

(21) Appl. No.: 18/457,919

(22) Filed: Aug. 29, 2023

(65) Prior Publication Data

US 2025/0035666 A1     Jan. 30, 2025

(30) Foreign Application Priority Data

Jul. 26, 2023     (TW) ................................. 112128041

(51) Int. Cl.
    *G01P 15/09*        (2006.01)
    *G01P 1/02*         (2006.01)
(52) U.S. Cl.
    CPC .......... *G01P 15/0915* (2013.01); *G01P 1/023* (2013.01)
(58) Field of Classification Search
    CPC ................................................. G01P 15/0915
    See application file for complete search history.

(56) References Cited

U.S. PATENT DOCUMENTS

| | | | | |
|---|---|---|---|---|
| 3,104,334 A | * | 9/1963 | Bradley, Jr. ............... | G01L 1/16 310/329 |
| 2020/0309811 A1 | * | 10/2020 | Nie .......................... | G01P 15/09 |
| 2026/0029423 A1 | * | 1/2026 | Rastegar ............. | G01P 15/0802 |

FOREIGN PATENT DOCUMENTS

| | | | | | |
|---|---|---|---|---|---|
| CN | 111366752 A | * | 7/2020 | ......... | G01P 15/0915 |
| DE | 10260087 A1 | * | 7/2004 | ......... | G01P 15/0915 |
| WO | WO-2012109259 A2 | * | 8/2012 | ............. | G01H 11/08 |

* cited by examiner

*Primary Examiner* — Stephen D Meier
*Assistant Examiner* — Ruben C Parco, Jr.
(74) *Attorney, Agent, or Firm* — RABIN & BERDO, P.C.

(57)     ABSTRACT

A shear mode piezoelectric accelerometer includes a ring-shaped piezoelectric element, a central shaft, a mass block, a first electrode, and a second electrode. The ring-shaped piezoelectric element includes an outer ring wall and an inner ring wall. The central shaft is made of conductive material and is fixed through the inner ring wall of the ring-shaped piezoelectric element. The mass block is made of conductive material and includes a fixed element and a weight element. The fixed element has a fixed hole and is fixed to the outer ring wall of the ring-shaped piezoelectric element by fitting the fixed hole. The weight element is located on the fixed element on the opposite side away from the fixed hole. The first electrode is electrically connected to the central shaft. The second electrode is electrically connected to the mass block.

10 Claims, 9 Drawing Sheets

A-A

SHEAR MODE PIEZOELECTRIC ACCELEROMETER

CROSS-REFERENCE TO RELATED APPLICATION

This non-provisional application claims priority under 35 U.S.C. § 119 (a) to Patent Application No. 112128041 filed in Taiwan, R.O.C. on Jul. 26, 2023, the entire contents of which are hereby incorporated by reference.

BACKGROUND

Technical Field

The present disclosure relates to an accelerometer, and in particular, to a shear mode piezoelectric accelerometer.

Related Art

At present, piezoelectric accelerometers may be configured to sense force, pressure, tension, acceleration, and the like, and may be mainly divided into compression mode, bending mode, and shear mode piezoelectric accelerometers based on measurement principles. The shear mode piezoelectric accelerometers have the best characteristics. The piezoelectric characteristics of piezoelectric elements in a shear direction are usually higher than those in other directions. Therefore, most of the conventional high-specification piezoelectric accelerometers are the shear mode piezoelectric accelerometers. However, the shear mode piezoelectric accelerometers are required with a large force (compared with compression mode pressure accelerometers and bending mode pressure accelerometers) to drive the piezoelectric elements (that is, the piezoelectric elements generate power). Therefore, the volume of mass blocks adopted for the shear mode piezoelectric accelerometers developed by major international factories is dozens of times larger than that of the piezoelectric elements, which will increase the overall volume of products, increase the cost, and limit the application.

SUMMARY

In view of the foregoing, a shear mode piezoelectric accelerometer is provided. The shear mode piezoelectric accelerometer includes a ring-shaped piezoelectric element, a central shaft, a mass block, a first electrode, and a second electrode. The ring-shaped piezoelectric element includes an outer ring wall and an inner ring wall. The central shaft is made of conductive material and is fixed through the inner ring wall of the ring-shaped piezoelectric element. The mass block is made of conductive material and includes a fixed element and a weight element. The fixed element has a fixed hole and is fixed to the outer ring wall of the ring-shaped piezoelectric element by fitting the fixed hole. The weight element is located on the fixed element on the opposite side away from the fixed hole. The first electrode is electrically connected to the central shaft. The second electrode is electrically connected to the mass block. The weight element of the mass block rotates relative to the central shaft, whereby the ring-shaped piezoelectric element is deformed and a potential difference is generated between the first electrode and the second electrode.

In some embodiments, the shear mode piezoelectric accelerometer further includes a body having a housing groove in which the ring-shaped piezoelectric element, the central shaft, and the mass block are housed.

In some embodiments, the housing groove includes an opening, and the weight element is exposed outside the opening.

In some embodiments, the fixed element has a notch located on the side opposite to the weight element.

In some embodiments, the body has a retaining wall, the retaining wall is located on a bottom surface of the housing groove, and the weight element is located above the retaining wall.

In some embodiments, the fixed element and the weight element are made of different materials, and the fixed element is made of conductive material.

In some embodiments, the weight element extends outward from the fixed element along a radial direction of the central shaft.

In some embodiments, the shear mode piezoelectric accelerometer further includes a processing unit connected to the first electrode and the second electrode respectively and generating a corresponding acceleration value according to the potential difference.

In some embodiments, the body is made of insulating material.

In some embodiments, the piezoelectric element is circular or C-shaped.

DETAILED DESCRIPTION

Figure 1:
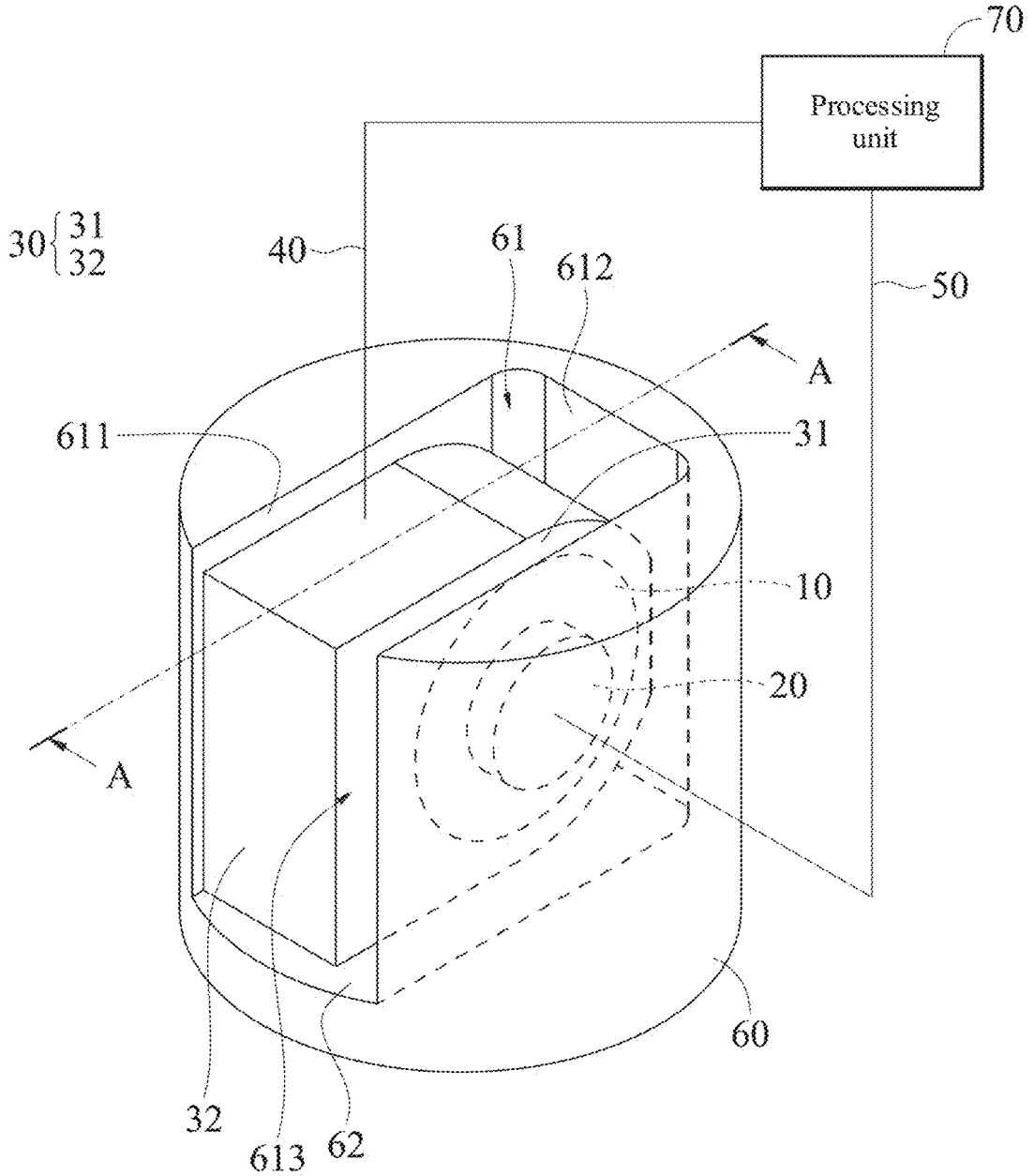
FIG. 1 illustrates a three-dimensional partial perspective view of a shear mode piezoelectric accelerometer in some embodiments.

Referring to FIG. 1, in some embodiments, a shear mode piezoelectric accelerometer may be configured to sense force, pressure, tension, acceleration value, and the like. The shear mode piezoelectric accelerometer includes a ring-shaped piezoelectric element 10, a central shaft 20, a mass block 30, a first electrode 40, and a second electrode 50.

Figure 2:
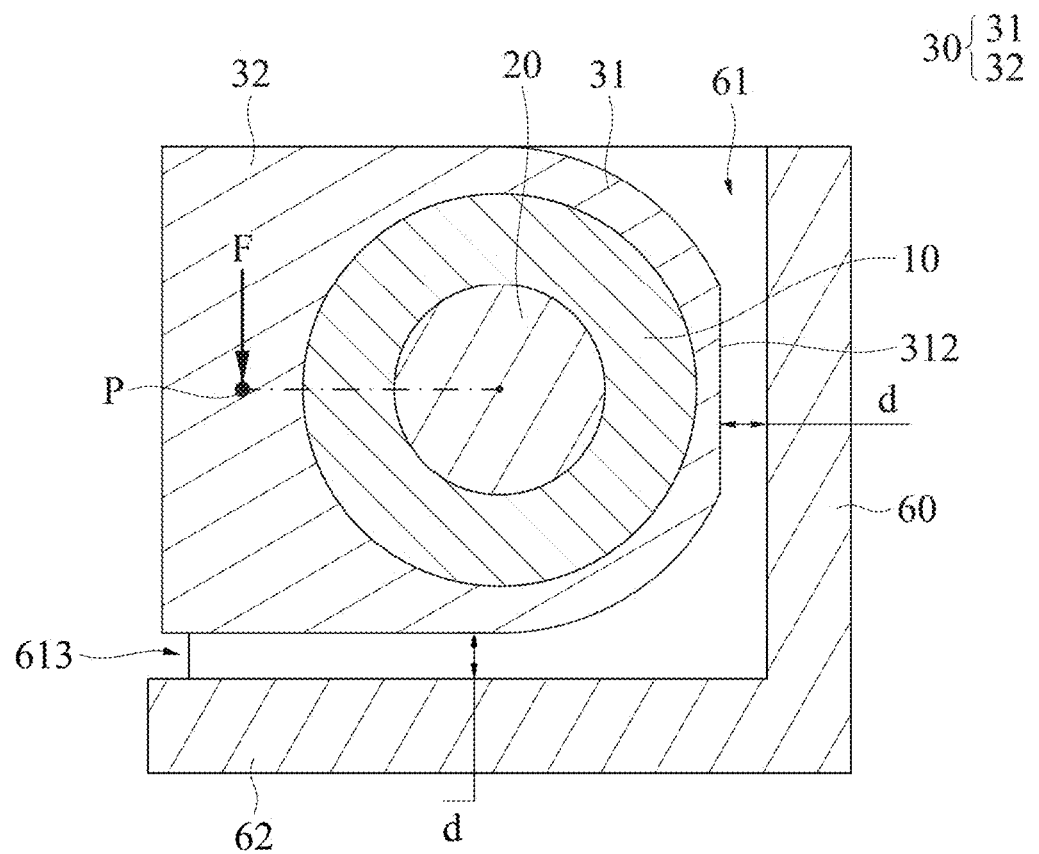
FIG. 2 illustrates a cross-sectional view of A-A of FIG. 1 in some embodiments.
Figure 3:
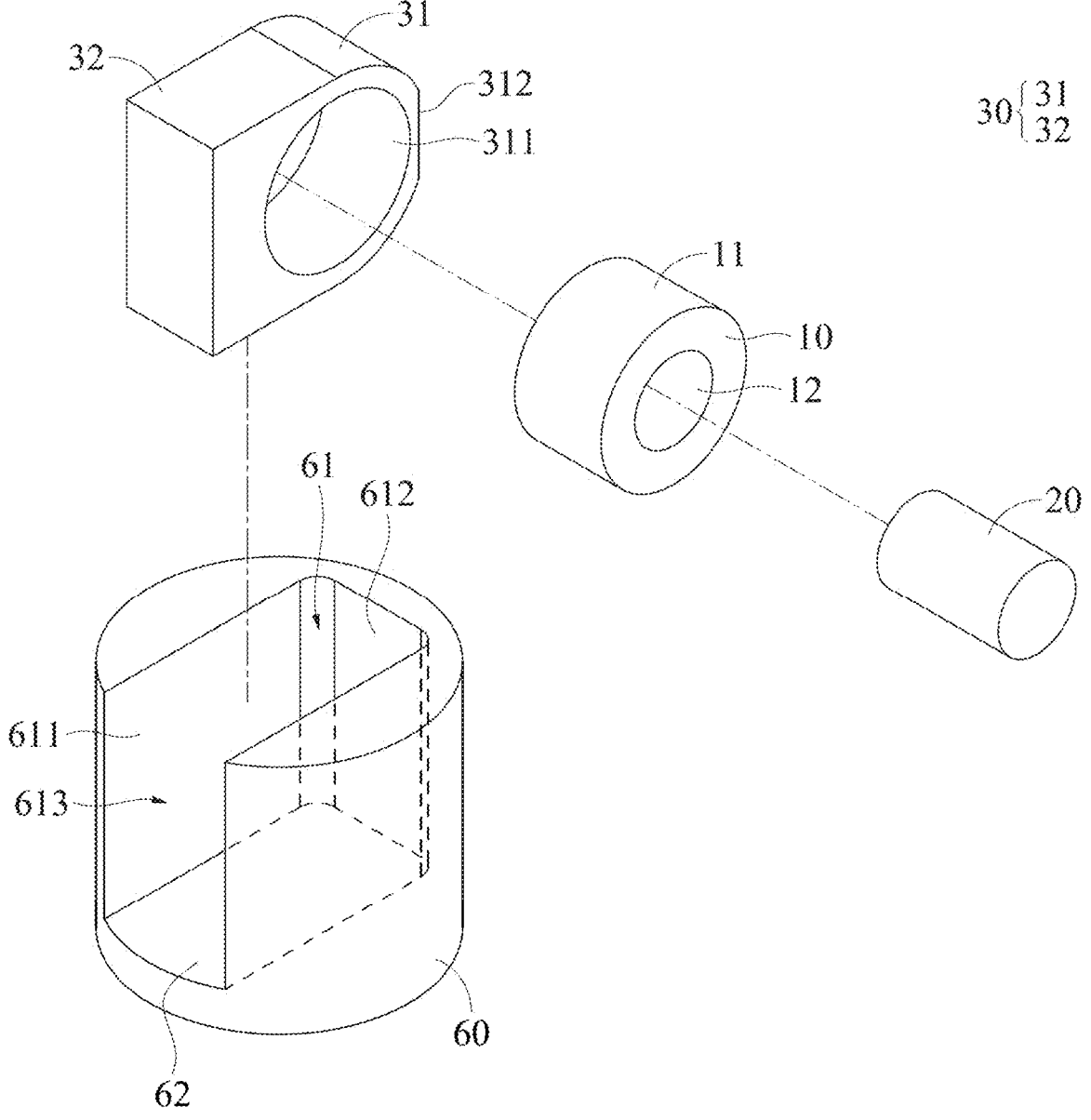
FIG. 3 illustrates an exploded view of a shear mode piezoelectric accelerometer in some embodiments.
Figure 5:
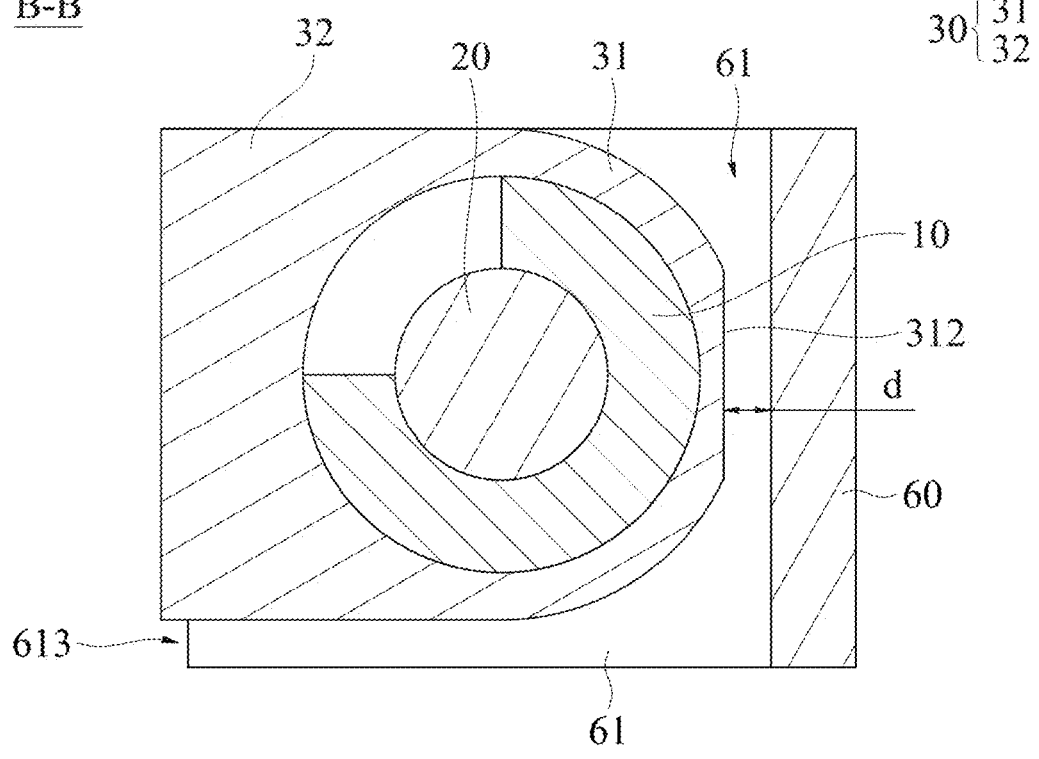
FIG. 5 illustrates a cross-sectional view of B-B of FIG. 4 in some embodiments.

Referring to FIG. 1, FIG. 2, and FIG. 3, the ring-shaped piezoelectric element 10 includes an outer ring wall 11 and an inner ring wall 12. As shown in FIG. 2 and FIG. 3, in some embodiments, the ring-shaped piezoelectric element 10 is circular. As shown in FIG. 5, in some embodiments, the ring-shaped piezoelectric element 10 has a notch and is thus C-shaped. In some embodiments, the ring-shaped piezoelectric element 10 is semicircular and arc-shaped depending on the size of the notch.

Referring to FIG. 1, FIG. 2, and FIG. 3, the central shaft 20 is made of conductive material (such as copper metal). The central shaft 20 is fixed through the inner ring wall 12 of the ring-shaped piezoelectric element 10. That is, the ring-shaped piezoelectric element 10 is located on a ring side surface of the central shaft 20. In some embodiments, the central shaft 20 is arranged horizontally and parallel to a horizontal plane.

Referring to FIG. 1, FIG. 2, and FIG. 3, the mass block 30 is made of conductive material (such as copper metal). The mass block 30 includes a fixed element 31 and a weight element 32. The fixed element 31 has a fixed hole 311. The fixed element 31 is fixed to the outer ring wall 11 of the ring-shaped piezoelectric element 10 by fitting the fixed hole 311. That is, the fixed element 31 is located on a surface of the outer ring wall 11, whereby the ring-shaped piezoelectric element 10 is located between the fixed element 31 and the central shaft 20. The weight element 32 is located on the fixed element 31 on the opposite side away from the fixed hole 311, whereby the center of gravity P of the mass block 30 is away from the central shaft 20, thereby increasing the distance from the center of gravity P to the ring-shaped piezoelectric element 10. In some embodiments, the ring-shaped piezoelectric element 10 is arc-shaped. A hole wall of the fixed hole 311 is recessed inward to form an arc-shaped groove. The ring-shaped piezoelectric element 10 is located in the arc-shaped groove, and one side of the ring-shaped piezoelectric element 10 is connected to the central shaft 20.

Referring to FIG. 1, FIG. 2, and FIG. 3, the second electrode 50 is electrically connected to the central shaft 20. In some embodiments, the second electrode 50 is a wire.

Referring to FIG. 1, FIG. 2, and FIG. 3, the first electrode 40 is electrically connected to the mass block 30. In some embodiments, the first electrode 40 is a wire. Therefore, the first electrode 40, the second electrode 50, the central shaft 20, the ring-shaped piezoelectric element 10, and the mass block 30 may form a conduction circuit together. The first electrode 40 and the second electrode 50 form a positive electrode and a negative electrode respectively for conducting power generated by the ring-shaped piezoelectric element 10.

Referring to FIG. 1, FIG. 2, and FIG. 3, when the weight element 32 is subjected to force F (such as inertia force, pressure, and tension) from top to bottom, an arm of force is formed from the center of gravity P to the central shaft 20, and a shear force is formed on the ring-shaped piezoelectric element 10, whereby the ring-shaped piezoelectric element 10 is deformed and power is generated. Since the first electrode 40, the second electrode 50, the central shaft 20, the ring-shaped piezoelectric element 10, and the mass block 30 form the conduction circuit together, a potential difference is generated between the first electrode 40 and the second electrode 50.

In the present disclosure, the force F applied to the mass block 30 is amplified by the concept of torque, thereby increasing the shear force of the ring-shaped piezoelectric element 10. Therefore, in the present disclosure, the ring-shaped piezoelectric element 10 may be deformed by using a small-sized mass block 30, and then the shear mode piezoelectric accelerometer is driven to operate. Therefore, the shear mode piezoelectric accelerometer in the present disclosure has the advantages of reducing the overall volume, reducing the cost, increasing the application range, and the like. In addition, as the center of gravity P is farther away from the central shaft 20, the arm of force between the center of gravity P and the central shaft 20 is longer, thereby increasing the shear force applied to the ring-shaped piezoelectric element 10, and then improving the detection sensitivity of the shear mode piezoelectric accelerometer of the present disclosure.

Referring to FIG. 1, FIG. 2, and FIG. 3, the shear mode piezoelectric accelerometer further includes a body 60. The body 60 has a housing groove 61, and the ring-shaped piezoelectric element 10, the central shaft 20, and the mass block 30 are housed in the housing groove 61. In some embodiments, the housing groove 61 is located in the body 60 to form left and right side walls 611 and an inner side wall 612. The central shaft 20 bridges between the left and right side walls 611 to form a horizontal state, whereby the shear mode piezoelectric accelerometer is configured to detect the force F in a Z-axis direction. In some embodiments, the body 60 is made of insulating material (such as plastic), so as to avoid short-circuiting the body 60 with other elements. In some embodiments, a distance d is provided between the mass block 30 and the body 60 for avoiding contact between the mass block 30 and the body 60.

Referring to FIG. 1, FIG. 2, and FIG. 3, in some embodiments, the housing groove 61 includes an opening 613, and the weight element 32 is exposed outside the opening 613. The weight element 32 may be wholly exposed outside the opening 613 or partially exposed outside the opening 613, whereby the center of gravity P of the mass block 30 is farther away from the central shaft 20.

Referring to FIG. 2 and FIG. 3, in some embodiments, the fixed element 31 has a notch 312. The notch 312 is located on the side opposite to the weight element 32. That is, the notch 312 is located on the side of the fixed element 31 facing the inner side wall 612. In this way, the center of gravity P of the mass block 30 deviates from the central shaft 20, so as to increase the length of the arm of force A to improve the detection sensitivity of the shear mode piezoelectric accelerometer. The notch 312 may be formed by the inward recess of the fixed element 31, or the notch 312 may be formed by partially cutting a ring wall outside the fixed element 31.

Figure 4:
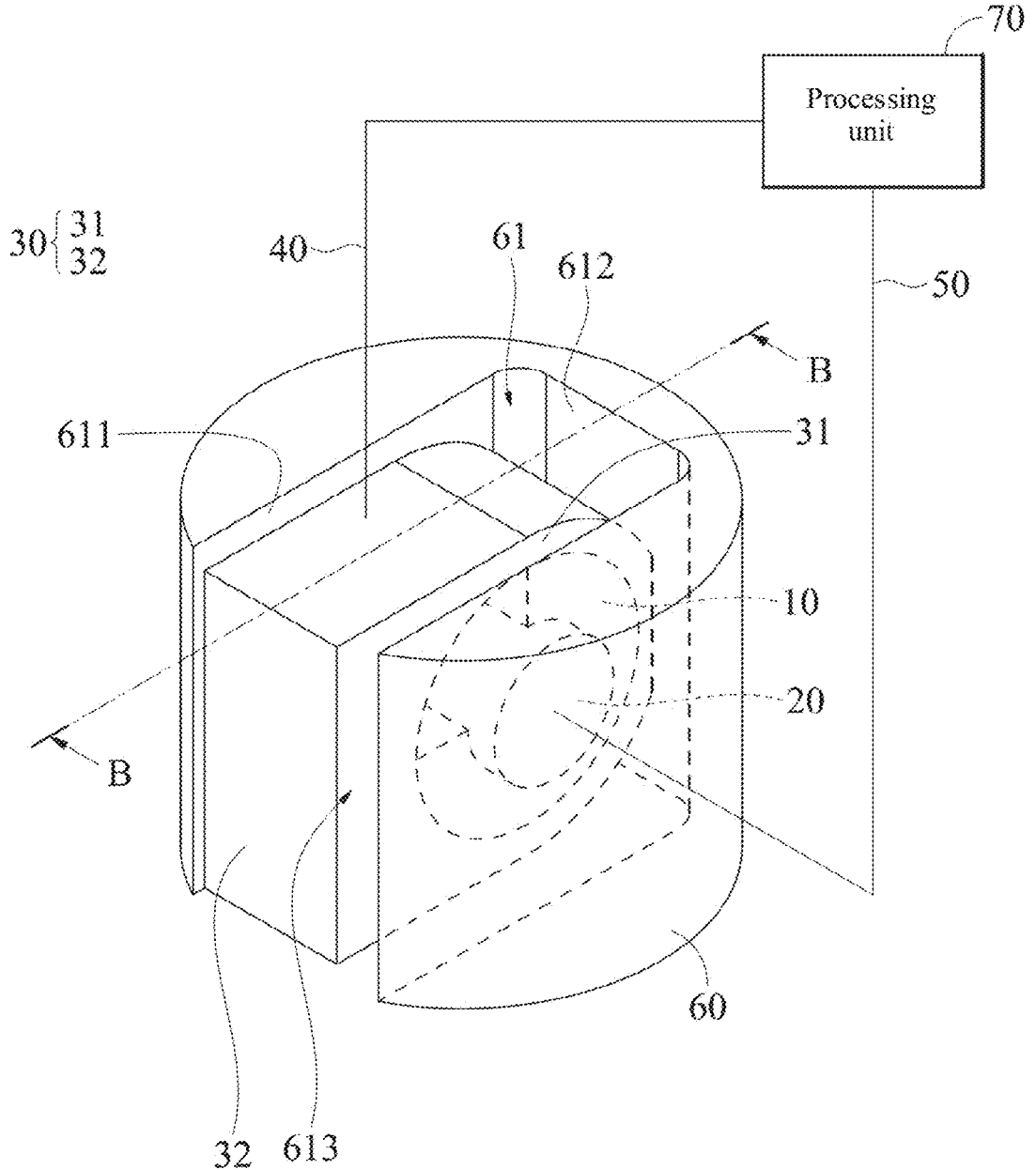
FIG. 4 illustrates a three-dimensional view of a shear mode piezoelectric accelerometer in some embodiments.

Referring to FIG. 4 and FIG. 5, in some embodiments, the opening 613 of the housing groove 61 extends from one side of the body 60 to a bottom surface of the body 60. Referring to FIG. 1 and FIG. 3, in some embodiments, the body 60 has a retaining wall 62. The retaining wall 62 is located on a bottom surface of the housing groove 61, and the weight element 32 abuts against the retaining wall 62.

Figure 6:
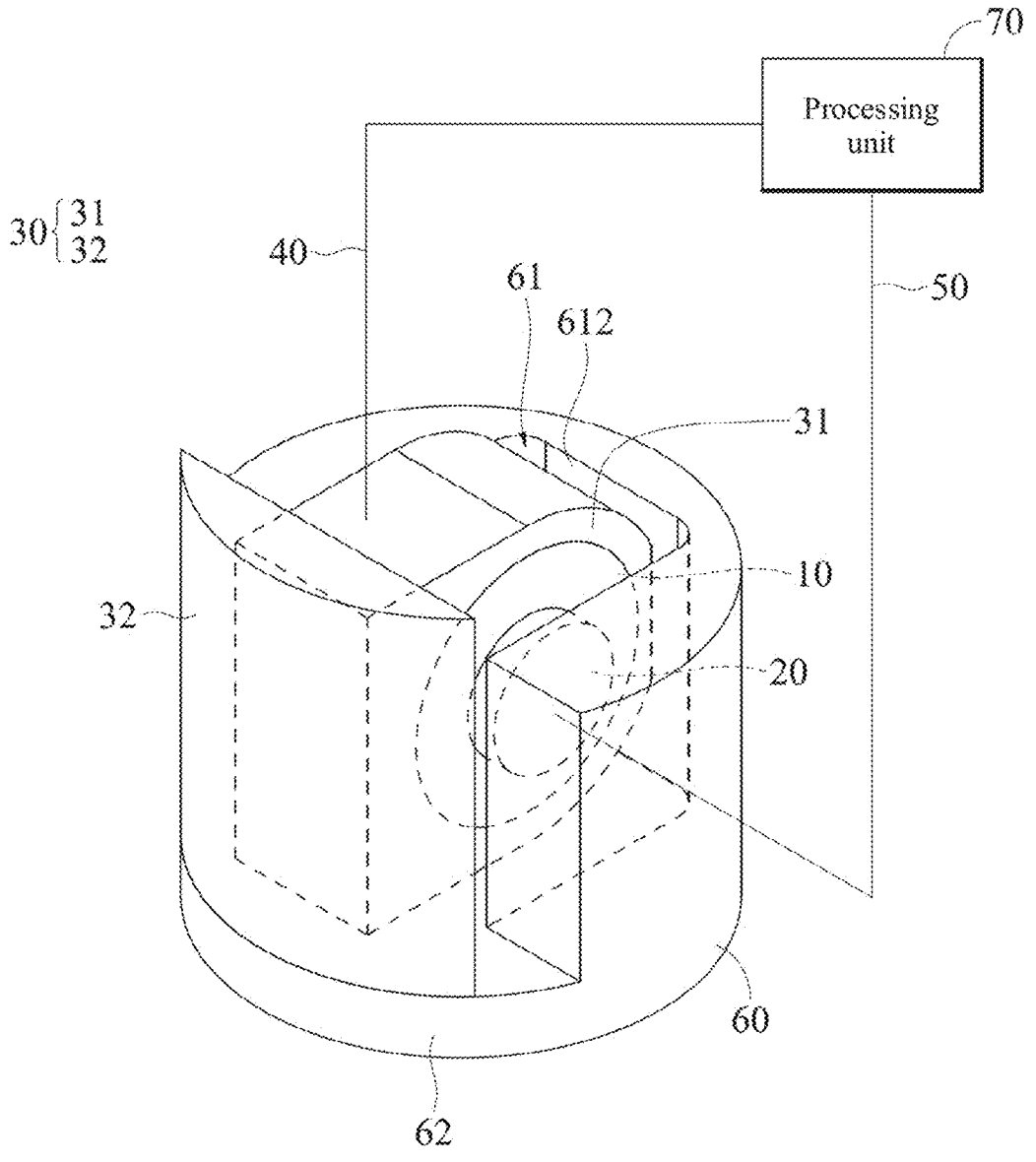
FIG. 6 illustrates a three-dimensional view of a shear mode piezoelectric accelerometer in some embodiments.
Figure 7:
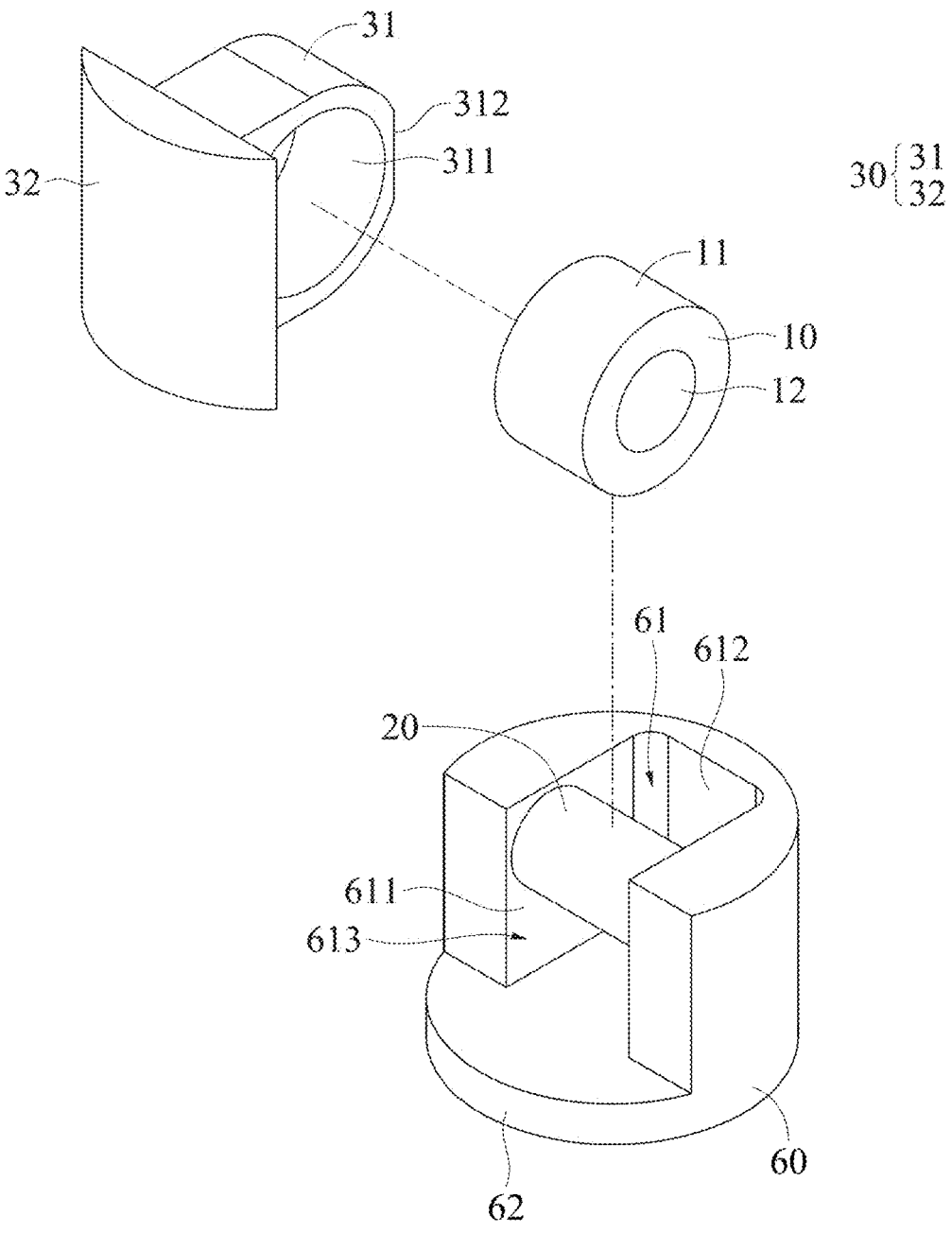
FIG. 7 illustrates a cross-sectional view of a shear mode piezoelectric accelerometer in some embodiments.

Referring to FIG. 6 and FIG. 7, in some embodiments, the fixed element 31 and the weight element 32 are made of different materials, and the fixed element 31 is made of conductive material. For example, the fixed element 31 is made of copper and the weight element 32 is made of iron without limitation. Furthermore, the weight element 32 may be shaped as a column, such as a cylinder, a semi-cylinder, or a polygonal column, and is perpendicular to one side of the fixed element 31, and the weight element 32 is partially or wholly exposed outside the opening 613. In addition, referring to FIG. 1, in some embodiments, the fixed element 31 and the weight element 32 are integrated. That is, the weight element 32 extends outward from the fixed element 31 along a radial direction of the central shaft 20. In this way, the center of gravity P of the mass block 30 greatly deviates from the central shaft 20, so as to improve the detection sensitivity of the shear mode piezoelectric accelerometer.

Referring to FIG. 1, the shear mode piezoelectric accelerometer further includes a processing unit 70. The processing unit 70 is connected to the first electrode 40 and the second electrode 50 respectively. The processing unit 70 generates a corresponding acceleration value according to the potential difference. In some embodiments, the processing unit 70 may obtain the acceleration value according to the potential difference and Formula:

$$a = \frac{\Delta v}{s},$$

where a is the acceleration value, s is a sensitivity value, Av is the potential difference, and the sensitivity value is a preset value. Each potential difference and the corresponding acceleration value may also be calculated in advance and stored in a database. The processing unit 70 finds the corresponding acceleration value in the database according to the potential difference. In some embodiments, the processing unit 70 may also obtain the value of the force F according to the potential difference by calculating a relationship between each potential difference and the force F in advance and storing the relationship in the database. The processing unit 70 finds the corresponding force F in the database according to the potential difference. In addition, in some embodiments, the sensitivity value is set by generating acceleration to the shear mode piezoelectric accelerometer using an oscillator, pulling out two signal lines at different phase angles between the first electrode 40 and the second electrode 50, connecting the signal lines to a charge-voltage converter (for example, 1 pC to 1 mV), converting analog signals transmitted by the two signal lines into digital signals via a capture card, and finally transmitting the digital signals to a computer via a USB interface. By using a variation of the foregoing formula:

$$s = \frac{\Delta v}{a},$$

the sensitivity value is obtained as a preset sensitivity value.

Although the shear mode piezoelectric accelerometer is described above for detecting the force F in the Z-axis direction, the shear mode piezoelectric accelerometer may be configured to detect force F in an X-axis direction and a Y-axis direction according to an arrangement posture. Furthermore, in some embodiments, the fixed hole 311 of the fixed element 31 is connected to the outer ring wall 11 of the ring-shaped piezoelectric element 10 via an adhesive, and the inner ring wall 12 of the ring-shaped piezoelectric element 10 is connected to the central shaft 20 via an adhesive.

Figure 8:
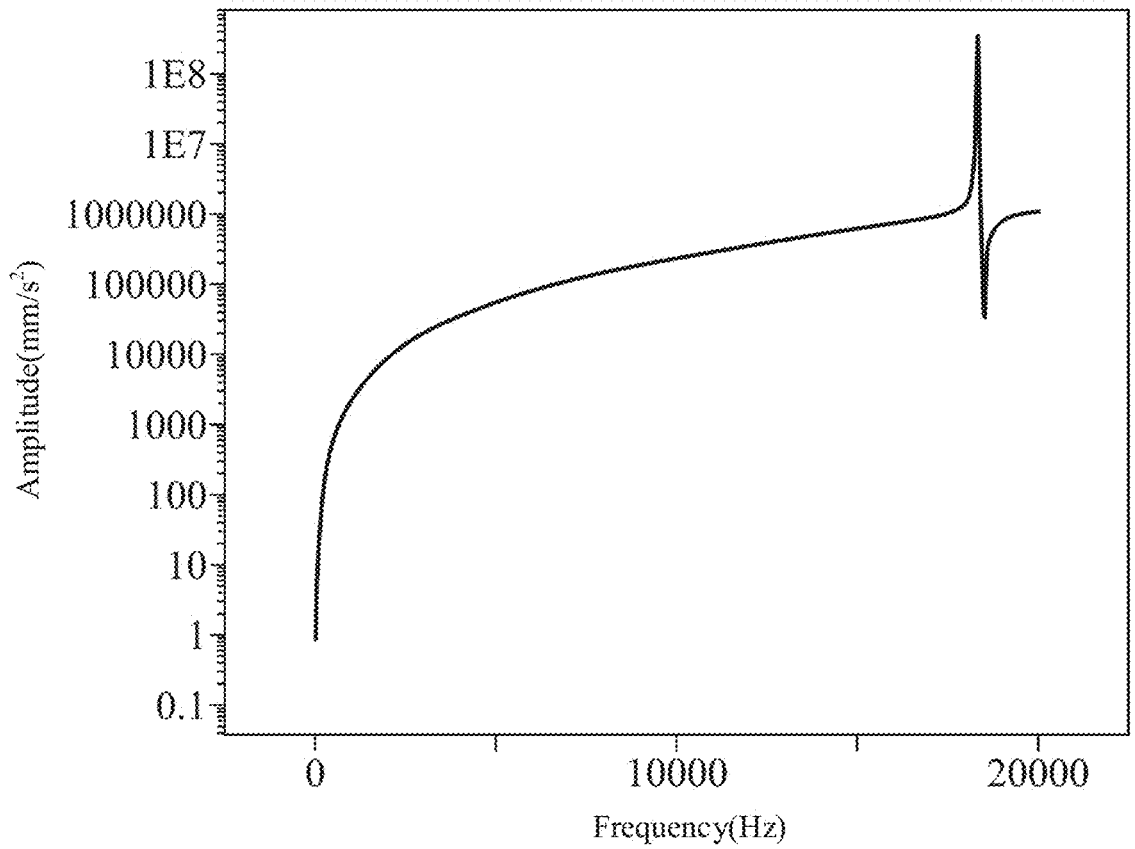
FIG. 8 illustrates an experimental data view of a shear mode piezoelectric accelerometer in some embodiments.
Figure 9:
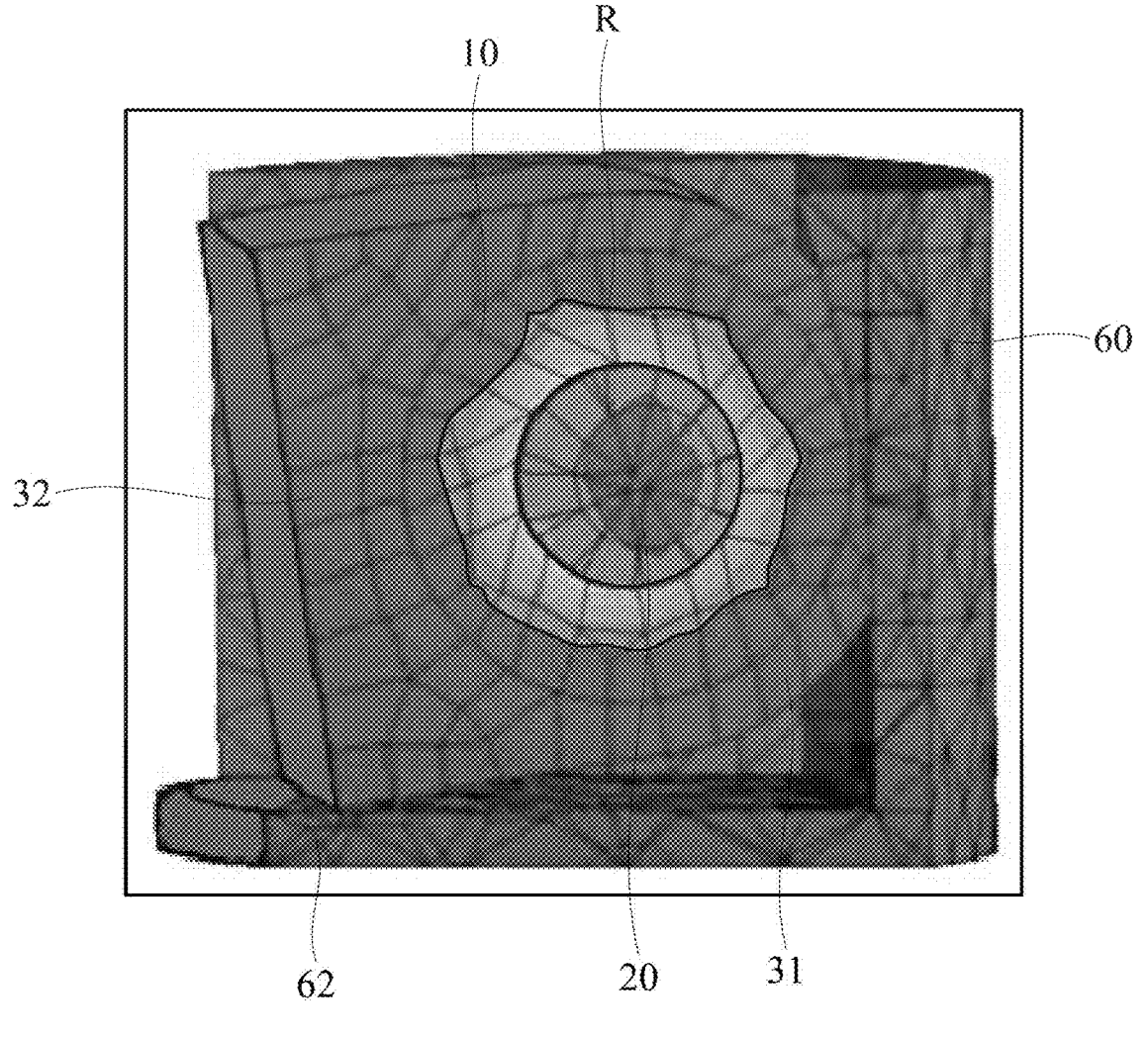
FIG. 9 illustrates an experimental data view of a shear mode piezoelectric accelerometer in some embodiments.

Referring to FIG. 8, the structure and characteristics of the shear mode piezoelectric accelerometer of the present disclosure are simulated and tested by Ansys software under the test conditions that the ring-shaped piezoelectric element 10 is made of lead zirconate titanate with density of 7700 kg/m$^3$, Young's modulus of 6E+10 Pa, Poisson's ratio of 0.34, bulk modulus of 6.25E+10 Pa, and shear modulus of 2.2388E+10 Pa, and the mass block 30 and the body 60 are made of stainless steel with density of 7750 kg/m$^3$, Young's modulus of 1.93E+10 Pa, Poisson's ratio of 0.31, bulk modulus of 1.693E+11 Pa, and shear modulus of 7.3664E+10 Pa. FIG. 8 shows that a resonant frequency of about 19 kHz may be obtained under the foregoing conditions. Therefore, the shear mode piezoelectric accelerometer of the present disclosure may improve the overall resonant frequency, thereby improving the overall available bandwidth range. In addition, referring to FIG. 9, stress on each part of the shear mode piezoelectric accelerometer of the present disclosure is analyzed by the Ansys software. The analysis results show that a region R located in the inner ring wall 12 of the ring-shaped piezoelectric element 10 has the maximum stress (about 1.1104e−8 MPa to 9.7129e−8 MPa), which is also a position where the shear mode piezoelectric accelerometer is deformed maximally.

What is claimed is:

1. A shear mode piezoelectric accelerometer, comprising:
a ring-shaped piezoelectric element, comprising an outer ring wall and an inner ring wall;
a central shaft, made of conductive material and fixed through the inner ring wall of the ring-shaped piezoelectric element;
a mass block, made of conductive material and comprising a fixed element and a weight element, the fixed element having a fixed hole and being fixed to the outer ring wall of the ring-shaped piezoelectric element by fitting the fixed hole, and the weight element being located on the fixed element and away from the fixed hole;
a first electrode, electrically connected to the central shaft; and
a second electrode, electrically connected to the mass block,
wherein the weight element of the mass block rotates relative to the central shaft, whereby the ring-shaped piezoelectric element is deformed and a potential difference is generated between the first electrode and the second electrode.

2. The shear mode piezoelectric accelerometer according to claim 1, further comprising a body having a housing groove in which the ring-shaped piezoelectric element, the central shaft, and the mass block are housed.

3. The shear mode piezoelectric accelerometer according to claim 2, wherein the housing groove comprises an opening, the weight element being exposed outside the opening.

4. The shear mode piezoelectric accelerometer according to claim 2, wherein the body has a retaining wall, the retaining wall being located on a bottom surface of the housing groove, and the weight element abutting against the retaining wall.

5. The shear mode piezoelectric accelerometer according to claim 2, wherein the body is made of insulating material.

6. The shear mode piezoelectric accelerometer according to claim 1, wherein the fixed element has a notch located on the side opposite to the weight element.

7. The shear mode piezoelectric accelerometer according to claim 1, wherein the fixed element and the weight element are made of different materials, and the fixed element is made of conductive material.

8. The shear mode piezoelectric accelerometer according to claim 1, wherein the weight element extends outward from the fixed element along a radial direction of the central shaft.

9. The shear mode piezoelectric accelerometer according to claim 1, further comprising a processing unit connected to the first electrode and the second electrode respectively and generating a corresponding acceleration value according to the potential difference.

10. The shear mode piezoelectric accelerometer according to claim 1, wherein the ring-shaped piezoelectric element is circular or C-shaped.

\* \* \* \* \*